United States Patent
Han et al.

(10) Patent No.: US 6,603,475 B1
(45) Date of Patent: Aug. 5, 2003

(54) METHOD FOR GENERATING STEREOGRAPHIC IMAGE USING Z-BUFFER

(75) Inventors: Soon Hung Han, Taejon (KR); Byoung Hyun Yoo, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 133 days.

(21) Appl. No.: 09/715,919

(22) Filed: Nov. 17, 2000

(30) Foreign Application Priority Data

Nov. 17, 1999  (KR) ............................................. 99-51079

(51) Int. Cl.[7] ............................................. G06T 15/40
(52) U.S. Cl. ........................................ 345/422; 345/427
(58) Field of Search ................................ 345/422, 419, 345/421, 427; 348/46, 48, 57, 42; 382/285

(56) References Cited

U.S. PATENT DOCUMENTS

| | | | | |
|---|---|---|---|---|
| 5,872,590 A | * | 2/1999 | Aritake et al. | 348/57 |
| 6,160,574 A | * | 12/2000 | Oba et al. | 348/46 |
| 6,392,689 B1 | * | 5/2002 | Golgoff | 348/44 |
| 6,445,392 B1 | * | 9/2002 | Morein et al. | 345/422 |
| 6,445,833 B1 | * | 9/2002 | Mutara et al. | 382/285 |

FOREIGN PATENT DOCUMENTS

| | | |
|---|---|---|
| JP | 07-200870 | 8/1995 |
| JP | 10-040420 | 2/1998 |

* cited by examiner

*Primary Examiner*—Mark Zimmerman
*Assistant Examiner*—Huedung X. Cao
(74) *Attorney, Agent, or Firm*—Vidas, Arrett & Steinkraus PA

(57) ABSTRACT

A method for generating a three-dimensional stereographic image on the basis of a two-dimensional planar image for one eye and depth information of the image stored in the Z-buffer. The first two-dimensional image for one eye of a viewer is created by rendering a three-dimensional model. Color information and depth information of the first two-dimensional image are stored in the frame buffer and the Z-buffer, respectively. The second two-dimensional image for the other eye of the viewer is created on the basis of the first two-dimensional image, the color information stored in the frame bufer, and the depth information stored in the Z-buffer. A stereographic image is generated on the basis of the first two-dimensional image and the second two-dimensional image.

4 Claims, 4 Drawing Sheets

Left image $$x_R^* = x_L^* - 2\frac{e}{1 - z/d_e}$$

Right image

Left image → Right image

METHOD FOR GENERATING STEREOGRAPHIC IMAGE USING Z-BUFFER

BACKGROUND OF THE INVENTION

1. Field of the Invention

The invention relates in general to a method for generating a three-dimensional stereographic image using a computer, and more particularly to a method for generating a three-dimensional stereographic image on the basis of a two-dimensional planar image for one eye and the depth information of the image stored in the Z-buffer.

2. Description of the Prior Art

Generally, a viewer can perceive a three-dimensional depth from eyes to the object of an image with any of the following two methods, one method based on one eye and the other method based on two eyes.

In one eye method, the viewer can perceive phenomena such as farness and nearness, parallel displacement, relative object size, overlap, brightness and shadow, focus adaptation, etc., with his one eye. The perspective phenomenon is based on parallel lines converging on the disappearance point. The parallel displacement phenomenon is based on the fact that, when the viewer's head moves, an object near the viewing point moves to a relatively greater degree than an object far from the plane of projection. The overlap phenomenon is based on the fact that a near object hides a far object. The focus adaptation phenomenon is based on the difference between the levels of strain applied to eye muscle in viewing objects at different distances.

In the two eyes method, the viewer can perceive an additional phenomenon in addition to the above phenomena with his two eyes. The additional phenomenon is based on the fact that the position of projection on the retina is different according to the convergence angle of two eyes, or the distance between the viewer and the object.

The perception by one eye provides a weak impression of the three-dimensional distance. However, the perception by both eyes provides a very strong impression of the three-dimensional distance because the human brain/eye system combines two different images perceived respectively by both eyes.

The characteristics of perception based on two eyes as stated above are applied to the stereography, which generates a stereographic image according to any of the variety of proposed technical approaches.

A conventional stereographic image generation method generates two two-dimensional images of one object, one image for the left eye and the other image for the right eye. This conventional stereographic image generation method generates two images projected on a two-dimensional plane on the basis of two different centers of projection (one center for the left eye and the other center for the right eye). For this purpose, the conventional image generation method employs the graphic pipeline structure as shown in FIG. 1.

FIG. 1 is the functional block diagram of the graphic pipeline structure employed in the conventional stereographic image generation method. The computer has to perform the following work in order to create and visualize the desired image on the screen of the computer using a three-dimensional graphic program.

The three-dimensional graphic program comprises of application-specific processing 110, scene processing 111, polygon processing 112, pixel processing 113, scene processing 121, polygon processing 122, and pixel processing 123. The scene processing 111, polygon processing 112, and pixel processing 113 constitute the procedure of generating an image projected on a two-dimensional plane for one eye (left eye). The scene processing 121, polygon processing 122, and pixel processing 123 constitute the procedure of generating an image projected on the two-dimensional plane for the other eye (right eye). Because the two procedures are identical, a description will hereinafter be given centering around the procedure of generating the two-dimensional image with respect to the left eye.

The application-specific processing 110 is the task where the user operates or moves a three-dimensional model according to an application program. The scene varies according to variations in model, illumination and background selection by the user. This scene variation is stored in a scene graph 117. This scene graph 117 is a graph-type database for storing detailed information of scenes, and all the information necessary to define scenes, such as model, illumination, sound, etc.

The scene processing 111 is the task to express an actual three-dimensional scene on the screen. This processing 111 reads information from the scene graph 117 and creates three-dimensional polygons to be rendered, based on the scene graph 117. In three-dimensional graphics, objects displayed on the screen are basically made of three-dimensional polygons. The scene processing 111 conducts a culling or "Level of Detail (LOD)" operation with respect to the scene graph 117 to eliminate unnecessary polygons and finally obtains a set of three-dimensional polygons.

The polygon processing 112 performs the task 114 of displaying the set of polygons on a two-dimensional monitor screen. The polygon processing 112 transforms three-dimensional polygons into two-dimensional polygons by projecting those three-dimensional polygons. At this time, the polygon processing 112 calculates brightness based on illumination, object texture, and other rendering information.

The pixel processing 113 creates color information of each pixel of an image which is finally displayed on the screen. The pixel processing 113 performs texturing, blending, and anti-aliasing operations on the basis of two-dimensional polygons and texture information. Then, the pixel processing 113 stores the resultant color information of each pixel of the two-dimensional image for the left eye in the frame buffer 115. The pixel processing 113 also stores depth information of each pixel in the Z-buffer 116 which provides the perspective effect (far and near phenomenon) of an object.

In a similar manner, the scene processing 121 creates three-dimensional polygons for the right eye, which are then transformed into two-dimensional polygons by the polygon processing 122. The pixel processing 123 stores color information and depth information of each pixel for the right eye in the frame buffer 125 and the Z-buffer 126, respectively.

In a general graphic pipeline structure, the above-stated four processing steps must be performed to display an object on the screen. Further, for the display of a stereographic image on the screen, two images required for two eyes must be obtained through two graphic pipeline structures as described above. Moreover, for the purpose of obtaining the two images required for two eyes, the stereographic projection step and the step for final image display on the computer screen must be performed twice, one for each image.

Projection matrices for the projection step can be expressed by the following equations 1 and 2.

$$[S_L] = [Tr_X][P_{rz}] = \begin{bmatrix} 1 & 0 & 0 & 0 \\ 0 & 1 & 0 & 0 \\ 0 & 0 & 1 & 0 \\ e & 0 & 0 & 1 \end{bmatrix} \begin{bmatrix} 1 & 0 & 0 & 0 \\ 0 & 1 & 0 & 0 \\ 0 & 0 & 0 & -1/d_c \\ 0 & 0 & 0 & 1 \end{bmatrix} \quad \text{[Equation 1]}$$

$$= \begin{bmatrix} 1 & 0 & 0 & 0 \\ 0 & 1 & 0 & 0 \\ 0 & 0 & 0 & -1/d_c \\ e & 0 & 0 & 1 \end{bmatrix}$$

$$[S_R] = [Tr_X][P_{rz}] = \begin{bmatrix} 1 & 0 & 0 & 0 \\ 0 & 1 & 0 & 0 \\ 0 & 0 & 0 & -1/d_c \\ -e & 0 & 0 & 1 \end{bmatrix} \quad \text{[Equation 2]}$$

In the above equations 1 and 2, $S_L$ is the two-dimensional image projection matrix for the left eye, and $S_R$ is the two-dimensional image projection matrix for the right eye.

For the generation of a stereographic image on the computer screen as stated above, two images of a three-dimensional object must be created, one image for the left eye and the other image for the right eye. To this end, the procedure of displaying an image on the computer screen as well as the stereographic projection step must be performed twice. All conventional three-dimensional stereographic image generation methods must follow through the above procedures, thus requires the computer calculation time, which is twice the time for generating non-stereo image. This results in considerable restrictions in use of stereographic images in three-dimensional simulations or animations.

SUMMARY OF THE INVENTION

The present invention has been made from the observation of the above problem. The objective of the present invention is to provide a method for generating a stereographic image using the Z-buffer, where two planar images required for generation of the stereographic image are created through generation of one image and simple additional tasks which are based on the created two-dimensional image, color information, and depth information stored in the Z-buffer.

In accordance with the present invention, the above objective can be accomplished by the method for generating a stereographic image using the Z-buffer. The first step is to create a two-dimensional image for one eye of the viewer by rendering a three-dimensional model, and to store color information and depth information of the first two-dimensional image in the frame buffer and the Z-buffer, respectively; the second step of creating the second two-dimensional image for the other eye of the viewer is based on the first two-dimensional image, the color information stored in the frame buffer, and the depth information stored in the Z-buffer; and the third step of generating the stereographic image is based on the first two-dimensional image and the second two-dimensional image.

Specifically, the above second step searches the first two-dimensional image for pixels corresponding respectively to pixels of the second two-dimensional image; and interpolates color values of the searched pixels of the first two-dimensional image to obtain color values of the second two-dimensional image.

More specifically, the above second step searches the first two-dimensional image for the pixels corresponding respectively to the pixels of the second two-dimensional image by applying the disparity (e) between left and right eyes of the viewer, the distance ($d_e$) from the viewing point to the plane of projection, and each pixel value ($x_L^*$) of the first two-dimensional image to the following equation.

$$x_L^* = x_R^* + 2\frac{e \times d_e}{d_e - z}$$

Then, the above second step obtains the color values of the second two-dimensional image by applying the color values of the first two-dimensional image to the following equation:

$$C_{x_R} = (1-a)C_{x_L} + aC_{x_{L+1}}$$

$$a = x_L^* - int(x_L^*)$$

where, $C_{x_R}$ is color value at the pixel coordinate $x_R^*$ of the second two-dimensional image, $C_{x_L}$ is color value at the pixel coordinate $x_L^*$ of the first two-dimensional image, and $C_{x_{L+1}}$ is color value at the next pixel coordinate $x_{L+1}^*$ of the first two-dimensional image.

In accordance with the present invention, there is a computer-readable storage medium or processor, which stores a program to execute the above-stated method for generating stereographic images using the Z-buffer.

BRIEF DESCRIPTION OF THE DRAWINGS

Features and advantages of the present invention can be more clearly understood from the following detailed description about the accompanying drawings, in which.

DETAILED DESCRIPTION OF THE PREFERRED EMBODIMENTS

In a preferred embodiment of the present invention, a method for generating a stereographic image using the Z-buffer comprises the step of creating a two-dimensional image for one eye by applying a three-dimensional model to the general graphic pipeline structure. At this step, color information of each pixel of the created two-dimensional image is stored in the frame buffer and depth information thereof is stored in the Z-buffer. Next, another two-dimensional image is created on the basis of the color information stored in the frame buffer and the depth information stored in the Z-buffer. Finally, a stereographic image is obtained by combining the two two-dimensional images created as stated above.

The above step of creating the two-dimensional image for one eye is performed in the same manner as the conventional one. Namely, a two-dimensional image is produced by sequentially performing the application-specific processing, scene processing, polygon processing, and pixel processing with respect to a three-dimensional object. Each processing is performed in the same manner as stated previously and the detailed description thereof will thus be omitted. Through these processing steps, finally, color information of each pixel is stored in the frame bUuffer and depth information of each pixel is stored in the Z-buffer.

Next, the other two-dimensional image is produced on the basis of the color information stored in the frame buffer and the depth information stored in the Z-buffer, as will hereinafter be described in detail.

Figure 1:
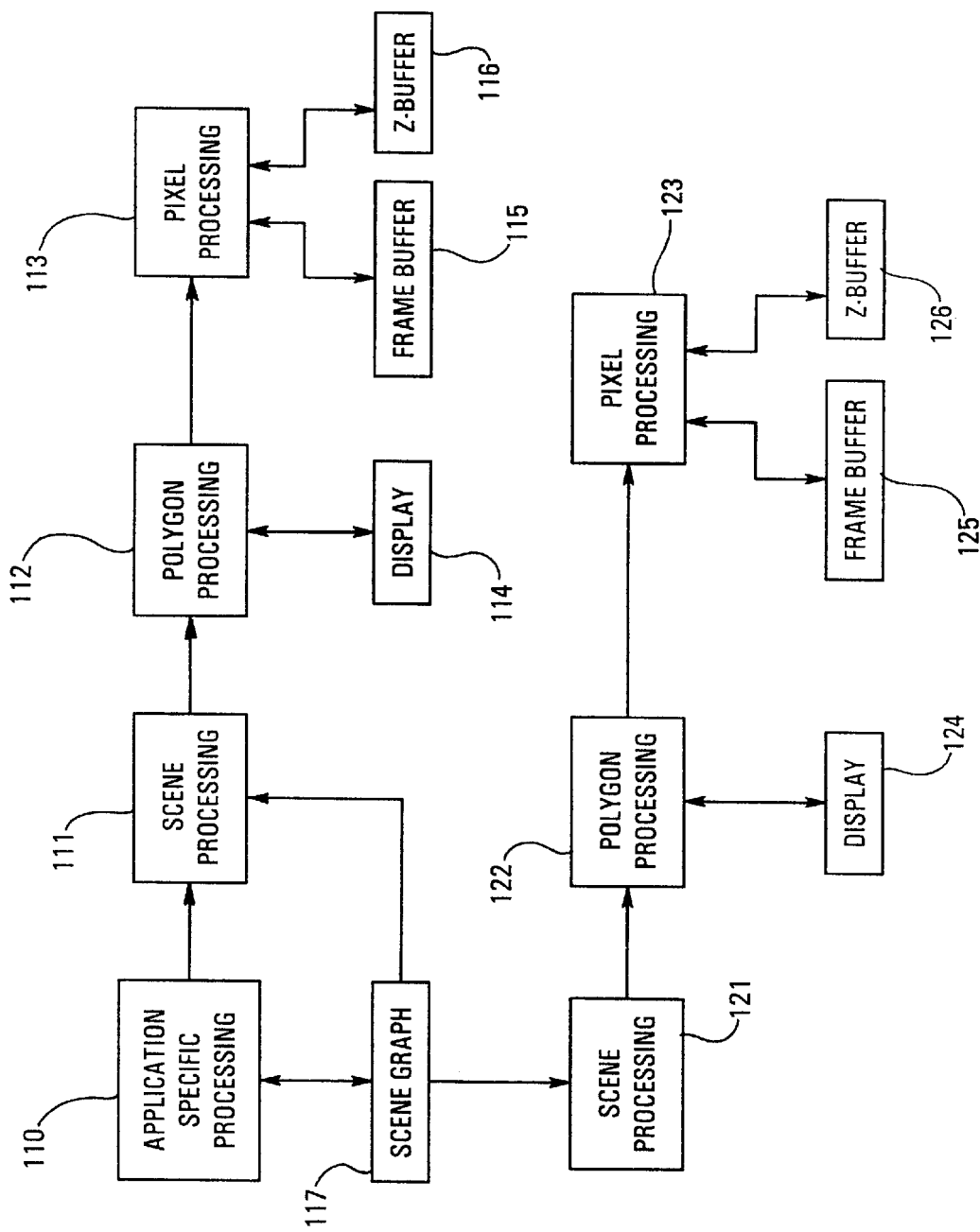
FIG. 1 is the functional block diagram of the graphic pipeline structure employed in the conventional stereographic image generation method.
Figure 2A:
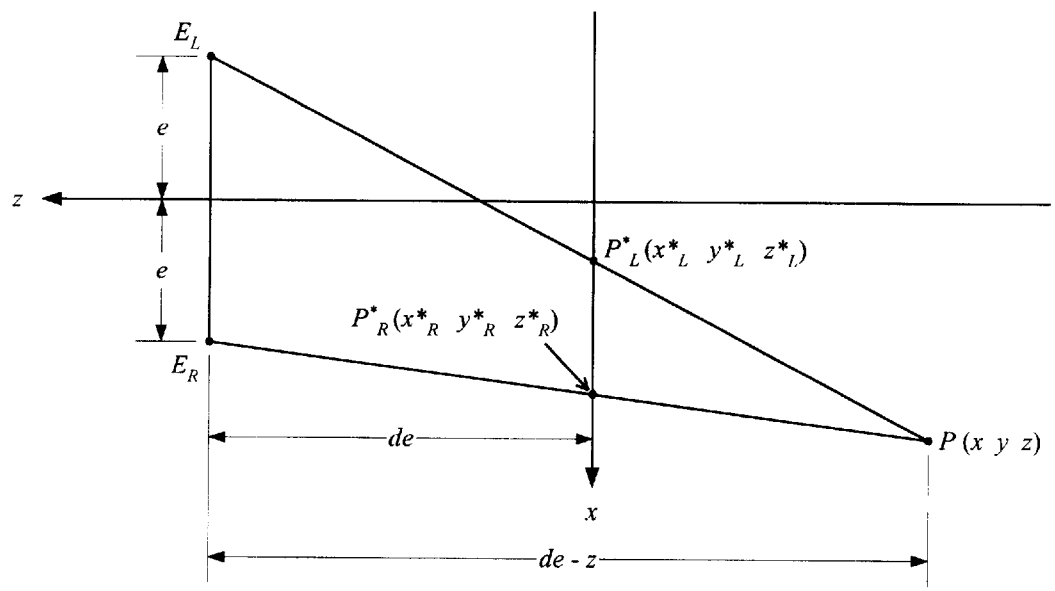
FIG. 2a is a view illustrating the state of image projection of point P(x, y, z) on the basis of the centers of projection at the viewing point $E_L(-e, 0, d_e)$ of the left eye and the viewing point $E_R(e, 0, d_e)$ of the right eye.
Figure 2B:
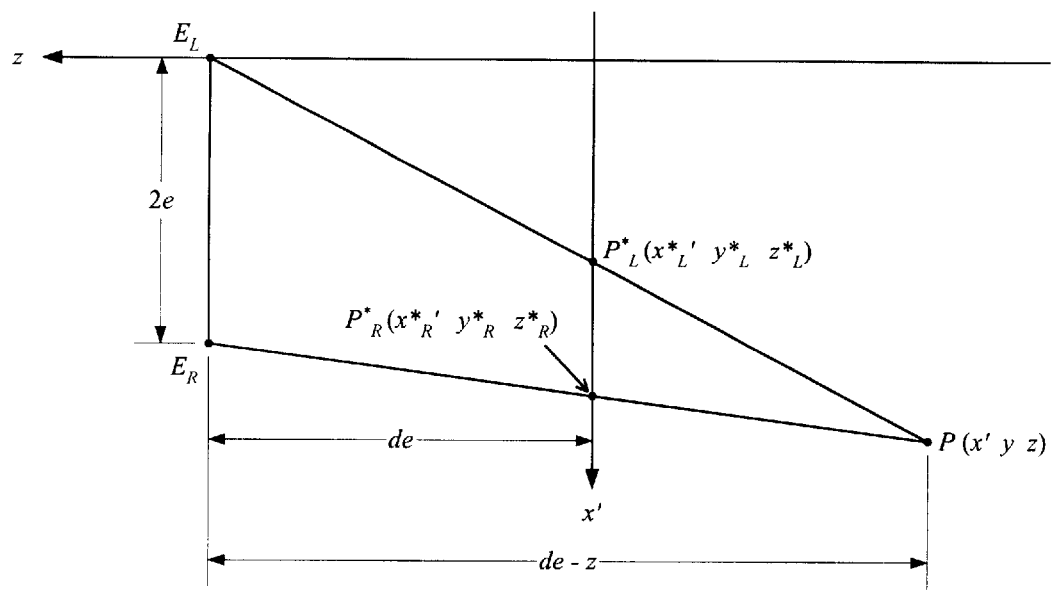
FIG. 2b is a view showing the movement of the projection center to place the viewing point of the left eye on the z-axis.

First, consider the following procedure of projection of a two-dimensional planar image to derive the expression of correlation between two images for two eyes. FIG. 2a is a view illustrating the state of image projection of P(x, y, z) on the basis of centers of projection at the viewing point $E_L(-e, 0, d_e)$ of the left eye and the viewing point $E_R(e, 0, d_e)$ of the right eye. FIG. 2b is a view showing the movement of the projection centers to place the viewing point of the left eye on the z-axis. Using a trigonometric ratio, the results are:

$$\frac{x_L^{*'}}{d_e} = \frac{x'}{d_e - z} \quad \text{[Equation 3]}$$

$$x_L^{*'} = \frac{x'}{1 - z/d_e} = \frac{x'}{1 + rz} \quad \text{[Equation 4]}$$

$$r = -1/d_e$$

Figures 2C, 3:
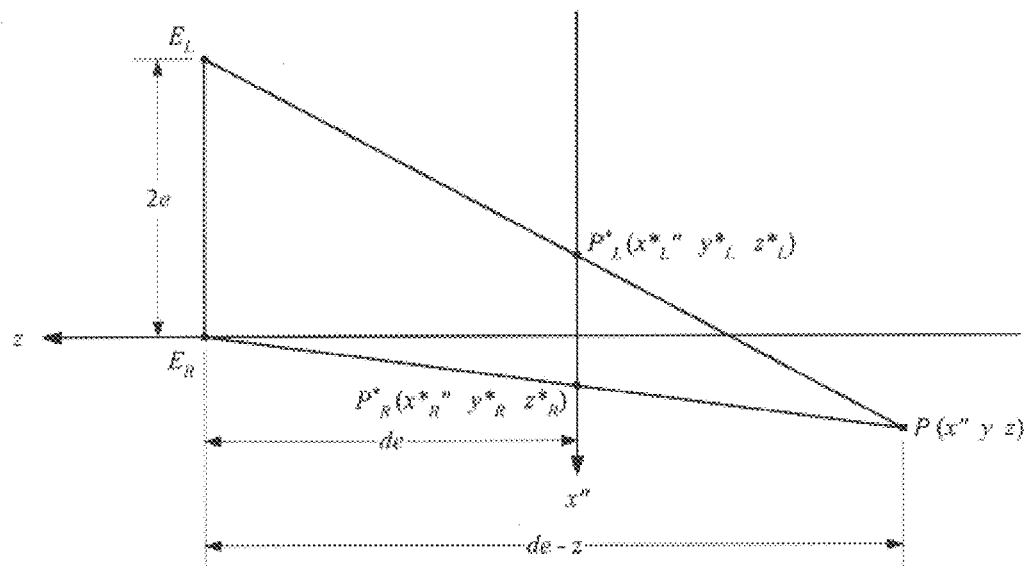
FIG. 2c is a view showing the movement of the projection centers to place the viewing point of the right eye on the z-axis.
FIG. 3 is a view illustrating the search for pixels of the left image corresponding to respective pixels of the right image to create the right image from the left image.
Figure 4:
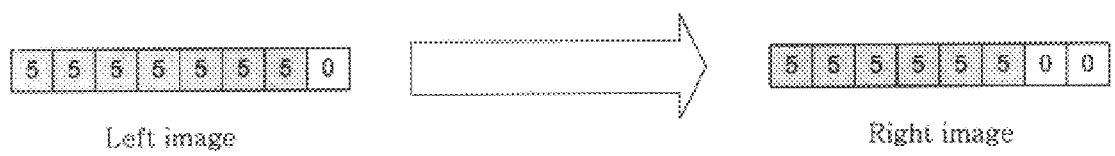
FIG. 4 is a view illustrating the search for pixels of the left image corresponding to respective pixels of the right image in one row of FIG. 3.

FIG. 2c is a view showing the movement of the projection center to place the viewing point of the right eye on the z-axis. Using a trigonometric ratio, the results are:

$$\frac{x_L^{*''}}{d_e} = \frac{x''}{d_e - z} \quad \text{[Equation 5]}$$

$$x_R^{*''} = \frac{x''}{1 - z/d_e} = \frac{x''}{1 + rz} \quad \text{[Equation 6]}$$

$$r = -1/d_e$$

Because y-coordinates are identical for both eyes, the expression for the y-axis can be defined as in the below equation 7.

$$y^* = \frac{y}{1 - z/d_e} = \frac{y}{1 + rz} \quad \text{[Equation 7]}$$

From the above basic expression, coordinates of an object projected on the left and right eyes can be derived as the below equations 8 and 9. At this time, the y-coordinate of the object is identical for left and right images as in the below equation 10.

$$x_L^* = \frac{x + e}{1 - z/d_e} \quad \text{[Equation 8]}$$

$$x_R^* = \frac{x - e}{1 - z/d_e} \quad \text{[Equation 9]}$$

$$y^* = \frac{y}{1 - z/d_e} \quad \text{[Equation 10]}$$

Rearranging the above equations 8 and 9, the following equations 11 and 12 can be established for $X_L^*$ and $X_R^*$.

$$x_R^* = \frac{x - e}{1 - z/d_e} = \frac{x + e}{1 - z/d_e} - 2\frac{e}{1 - z/d_e} = x_L^* - 2\frac{e}{1 - z/d_e} \quad \text{[Equation 11]}$$

$$x_L^* = \frac{x + e}{1 - z/d_e} = \frac{x - e}{1 - z/d_e} + 2\frac{e}{1 - z/d_e} = x_R^* + 2\frac{e}{1 - z/d_e} \quad \text{[Equation 12]}$$

In the present invention, a two-dimensional image for one eye (for example, the left eye) is obtained on the basis of the transform matrix of the equation 1 and a two-dimensional image for the right eye is simply obtained from the two-dimensional image for te left eye.

As seen from the equation 11, the coordinates of the image for the right eye can readily be calculated from the coordinates of the image for the left eye on the basis of the parameter (e), which indicates the level of the mismatch between the left and right images of the stereographic image. The parameter (e) corresponds to half the distance between two eyes. The parameter ($d_e$) corresponding to the distance from the viewing point to the plane of projection is also used.

The three-dimensional image can be displayed on a two-dimensional display unit of a computer according to the above general method. In this case, the above-stated projection transform is based on the set of two-dimensional coordinates and depth information of each coordinate along the z-axis. Information required to draw two-dimensional coordinates on a monitor screen of the computer is stored in the frame buffer of the computer, and depth information along the z-axis is stored in the Z-buffer (depth buffer).

Therefore, only the image for the left eye is created by the general method and the image for the right eye is created as shown in FIG. 3. Depth information of each pixel from the Z-buffer of the computer, the image mismatch level (e) used for the creation of the left image, and the distance ($d_e$) from the viewing point to the projection plan are applied to the equation 11.

FIG. 3 is a view illustrating the creation of the right image from the left image using the principle of the equation 11. In FIG. 3, points in a grid represent respective pixels on the computer screen and numerals therein represent depths along the z-axis stored in the Z-buffer. The right image of FIG. 3 can be obtained from the left image thereof according to the specific algorithm, as will hereinafter be described in detail.

As stated previously with reference to FIG. 2, the difference between two images resulting from the distance between two eyes exists only in the x-axis direction. In this connection, the equation 11 is calculated with respect to pixels in one row of an image and such calculation is repeated for every row.

Obtaining the right image from the left image signifies that color information of each pixel of the right image is obtained from the left image by mapping color information of the left image onto the right image. The color information of the right image can be obtained by the following manner.

Arranging the equation 11 centering around $x_L^*$, the result is:

$$x_L^* = x_R^* + 2e \times \frac{d_e}{d_e - z} \quad \text{[Equation 13]}$$

In order to obtain color information of $x_R^*$ of each pixel of the ight image, the coordinate $x_L^*$ of the original image is calculated on the basis of the equation 13.

Color information of $x_R^*$ is calculated from the calculated result of $x_L^*$. The coordinate of each pixel is an integer, but the calculated result may not be an integer. In this regard, the image quality can be improved using an interpolation as in the below equation 14. Here, $C_{x_R}$ is color information at the pixel coordinate $x_R^*$ of the right image, $C_{x_L}$ is color information at the coordinate obtained by making the calculated result of (non-integer) $x_L^*$ into an integer, and $C_{x_{L+1}}$ is color information at the next pixel coordinate of the left image.

$$C_{x_R} = (1-a)C_{x_L} + aC_{x_{L+1}}$$
$$a = x_L^* - int(x_L^*)$$
[Equation 14]

Describing the above two steps again, the color value of each pixel of the right image is obtained from the left image to create the right image from the left image (original image). That is, the original image is searched for pixels corresponding to pixels of the right image which will be created on the basis of the equation 13. Then, color values of the corresponding pixels of the original image are interpolated on the basis of the equation 14, an the interpolated results are used as color values of the right image.

The above procedure is repeated with respect to each pixel of the right image in such a manner that, if the calculation operation is completed for one row of the image (pixel by pixel), then it proceeds to the next row.

As apparent from the above description, according to the present invention, only one two-dimensional image is created by applying a three-dimensional model to the general image generation method, and another two-dimensional image is created by applying the above created two-dimensional image to the specific algorithm. Then, a stereographic image is generated by combining these two two-dimensional images. Therefore, compared to the conventional three-dimensional stereographic image generation method which requires twice the amount of computer calculation time of the general image generation method, the present method can readily and rapidly generate the stereographic image through the simple algorithm without doubling the calculation load of the computer.

Although the preferred embodiments of the present invention have been disclosed for illustrative purposes, those who have knowledge in this domain will appreciate that various modifications, additions, and substitutions are possible, without departing from the scope and spirit of the invention as disclsed in the accompanying claims.

What is claimed is:

1. A method for generating stereographic images using the Z-buffer, comprising the steps of:
   a) creating the first two-dimensional image for one eye of a viewer by rendering a three-dimensional model, and storing color information and depth information of said first two-dimensional image in the frame buffer and said Z-buffer, respectively;
   b) creating the second two-dimensional image for the other eye of the viewer on the basis of said first two-dimensional image, said color information stored in said frame buffer, and said depth information stored in said Z-buffer; and
   c) generating said stereographic image on the basis of said first two-dimensional image and said second two-dimensional image; wherein said step b) includes the steps of:
   b-1) searching said first two-dimensional image for pixels corresponding respectively to pixels of said second two-dimensional image; and
   b-2) interpolating color values of the searched pixels of said first two-dimensional image and obtaining color values of said second two-dimensional image according to the interpolated results.

2. The method as set forth in claim 1, wherein said step b-1) includes the step of searching said first two-dimensional image for the pixels corresponding respectively to the pixels of said second two-dimensional image by applying the disparity (e) of the mismatch between left and right images corresponding to half the distance between two eyes of the viewer, the distance ($d_e$) from the viewing point to the plane of projection, and each pixel information $x_L^*$ of said first two-dimensional image to the following equation:

$$x_L^* = x_R^* + 2\frac{e \times d_e}{d_e - z}.$$

3. The method as set forth in claim 1, wherein said step b-2) includes the step of obtaining the color values of said second two-dimensional image by applying the color values of said first two-dimensional image to the following equation:

$$C_{x_R} = (1-a)C_{x_L} + aC_{x_{L+1}}$$
$$a = x_L^* - int(x_L^*)$$

where, $C_{x_R}$ is color information at each pixel coordinate $x_R^*$ of said second two-dimensional image, $C_{x_L}$ is color information at each pixel coordinate $x_L^*$ of said first two-dimensional image, and $C_{x_{L+1}}$ is color information at the next pixel coordinate $x_{L+1}^*$ of said first two-dimensional image.

4. A computer-readable storage medium or processor for storing the program configured to execute the steps of:
   a) creating the first two-dimensional image for one eye of the viewer by rendering a three-dimensional model, and storing color information and depth information of said first two-dimensional image in the frame buffer and the Z-buffer, respectively;
   b) searching said first two-dimensional image for pixels corresponding respectively to pixels of the second two-dimensional image for the other eye of the viewer on the basis of said first two-dimensional image and said depth information stored in said Z-buffer;
   c) interpolating color values of the searched pixels of said first two-dimensional image and obtaining color values of said second two-dimensional image according to the interpolated results; and
   d) generating a stereographic image on the basis of said first two-dimensional image and said second two-dimensional image.

* * * * *